United States Patent
Ball

(10) Patent No.: US 12,332,883 B2
(45) Date of Patent: Jun. 17, 2025

(54) METHOD AND SYSTEM FOR QUERY OPTIMIZATION

(71) Applicant: YAHOO ASSETS LLC, Dulles, VA (US)

(72) Inventor: Joshua Ball, Sunnyvale, CA (US)

(73) Assignee: YAHOO ASSETS LLC, Dulles, VA (US)

( * ) Notice: Subject to any disclaimer, the term of this patent is extended or adjusted under 35 U.S.C. 154(b) by 225 days.

(21) Appl. No.: 15/450,809

(22) Filed: Mar. 6, 2017

(65) Prior Publication Data

US 2018/0253471 A1    Sep. 6, 2018

(51) Int. Cl.
*G06F 16/24* (2019.01)
*G06F 16/2453* (2019.01)

(52) U.S. Cl.
CPC .. *G06F 16/24534* (2019.01); *G06F 16/24537* (2019.01)

(58) Field of Classification Search
None
See application file for complete search history.

(56) References Cited

U.S. PATENT DOCUMENTS

| | | | | |
|---|---|---|---|---|
| 5,367,675 A * | 11/1994 | Cheng | ............... | G06F 16/24544 |
| 6,301,581 B1 * | 10/2001 | Smiley | .................. | G06F 16/252 |
| | | | | 707/718 |
| 6,339,768 B1 * | 1/2002 | Leung | ............... | G06F 16/24535 |
| 8,949,242 B1 * | 2/2015 | Lin | .......................... | G06F 16/36 |
| | | | | 707/739 |
| 9,043,319 B1 * | 5/2015 | Burns | .................... | G06F 16/252 |
| | | | | 707/725 |
| 2003/0167258 A1 * | 9/2003 | Koo | .................... | G06F 16/24535 |
| 2004/0215626 A1 * | 10/2004 | Colossi | ............. | G06F 16/24542 |
| 2005/0138073 A1 * | 6/2005 | Zhou | ...................... | G06F 16/284 |
| 2007/0130110 A1 * | 6/2007 | Graefe | .............. | G06F 16/24537 |
| 2011/0082856 A1 * | 4/2011 | Subbiah | ............ | G06F 16/24542 |
| | | | | 707/718 |
| 2012/0284062 A1 * | 11/2012 | Aubry | .................... | G06Q 50/14 |
| | | | | 705/5 |
| 2015/0178278 A1 * | 6/2015 | Finkelstein | ....... | G06F 16/24578 |
| | | | | 707/751 |

(Continued)

OTHER PUBLICATIONS

Michael Schmidt; Foundations of SPARQL Query Optimization; ACM; 2010; pp. 4-33.*

*Primary Examiner* — Ann J Lo
*Assistant Examiner* — Jermaine A Mincey
(74) *Attorney, Agent, or Firm* — Venable LLP

(57) ABSTRACT

The present teaching relates to methods and systems for query optimization by receiving a query stream comprising a plurality of queries from one or more applications via the network; determining relationships among the plurality of queries, wherein each of the relationships is associated with a prior probability; modeling the plurality of queries based on the relationships with the corresponding prior probabilities; re-writing at least one of the plurality of queries based on the model for the plurality of queries by, for each of the at least one of the plurality of queries generating a new query based on more than one query in the plurality of queries that are related via one of the relationships with a corresponding prior probability, and updating the corresponding prior probability based on the model of the plurality of queries.

17 Claims, 14 Drawing Sheets

(56) References Cited

U.S. PATENT DOCUMENTS

2017/0060944 A1* 3/2017 Khayyat .............. G06F 16/2282
2017/0132276 A1* 5/2017 Saurabh ............ G06F 16/24534
2017/0249361 A1* 8/2017 Gordon ............... G06F 16/2455

* cited by examiner

METHOD AND SYSTEM FOR QUERY OPTIMIZATION

1. TECHNICAL FIELD

The present teaching relates to methods, systems, and programming for optimizing queries and in this way to reduce delay of query processing. Particularly, the present teaching is directed to methods and systems for query optimization through re-writing queries into fewer queries and reducing communication with databases.

2. BACKGROUND

During query processing, application servers make round trips to database server, e.g. the number of round trips is n. The number of round trips n is usually less than the optimal number, i.e. n–k=optimal number of round trips where k is the undesired number of round trips, either the queries (e.g. SQL queries) are hand-written or tool-generated. This undesired number of round trips causes latency in database-driven applications, especially in cloud networking environment. Thus, it is desired to optimize the query statements. Without foreknowledge of what queries the application server will make in future, tools cannot generate optimal query statements, and a conventional method to solve this problem is through hand-writing distinct query statements by developers for every possible code path for a small amount of query statements. However, for a large amount of query statements, the huge number of possible paths would render the hand-writing impractical. Conventional method such as Quro analyzes and re-arranges the order of query statements into an order that causes less contention in the database (FIG. 1). The order of the re-arranged query statements may improve the efficiency by reducing the processing time that the higher priority statements (statements A) are processed first before the statements have less priority (statements B). Quro however does not change or reduce the number of query statements or re-write the query statements as the number of queries in FIG. 2 before and after re-arrangement is not reduced. As an example, FIG. 2(*a*) shows that a conventional art does not change the number of queries (5 queries of Q1-Q5) from applications App 1-N (N being a natural number) after passing through the database connector 202 approaching the database 1-K with SQL engines 1-K (K being a natural number) and the efficiency cannot be reduced by reducing the number of queries.

Another conventional method QBS (Query By Synthesis) synthesizes invariants and post-conditions or constraints for a code fragment expressed by a new theory of ordered relations so as to reason precisely the content and order of records-produced complex code fragments to compute join and aggregation. QBS identifies places in queries so that the application can be pushed into, and automatically transform the code to carry out such pushing into the queries (SQL queries). In particular, QBS carries out static analysis in a codebase and collects invariants, transforms these invariants into relational algebra, and replaces business logic with equivalent SQL queries for situation that the object-oriented application sever communicates with the relation-oriented database through object-relational mapper ORM providing transparent access to the database. Also, the synthesized post-conditions can be readily translated to SQL queries. This 'white box', compile-time approach fails when source code is unavailable, must be tailored for each programming language, and cannot optimize queries generated dynamically at runtime. Therefore, there is a demand of a method that can reduce the number of queries, independent of source code availability or programming language, so as to increase the process efficiency and reduce the round trips n to solve the problem of latency in database-driven applications especially in networking environment of cloud.

SUMMARY

The present teaching relates to methods for query optimization by receiving a query stream comprising a plurality of queries from one or more applications via the network; determining relationships among the plurality of queries, wherein each of the relationships is associated with a prior probability; modeling the plurality of queries based on the relationships with the corresponding prior probabilities; re-writing at least one of the plurality of queries based on the model for the plurality of queries by, for each of the at least one of the plurality of queries generating a new query based on more than one query in the plurality of queries that are related via one of the relationships with a corresponding prior probability, and updating the corresponding prior probability based on the model of the plurality of queries.

An exemplary system, having at least one processor, storage, and a communication platform connected to a network for query optimization by receiving a query stream comprising a plurality of queries from one or more applications via the network; determining relationships among the plurality of queries, wherein each of the relationships is associated with a prior probability; modeling the plurality of queries based on the relationships with the corresponding prior probabilities; re-writing at least one of the plurality of queries based on the model for the plurality of queries by, for each of the at least one of the plurality of queries generating a new query based on more than one query in the plurality of queries that are related via one of the relationships with a corresponding prior probability, and updating the corresponding prior probability based on the model of the plurality of queries.

An exemplary machine-readable tangible and non-transitory medium having information for database operation, when read by the machine, causes the machine to perform the following: receiving a query stream comprising a plurality of queries from one or more applications via the network; determining relationships among the plurality of queries, wherein each of the relationships is associated with a prior probability; modeling the plurality of queries based on the relationships with the corresponding prior probabilities; re-writing at least one of the plurality of queries based on the model for the plurality of queries by, for each of the at least one of the plurality of queries generating a new query based on more than one query in the plurality of queries that are related via one of the relationships with a corresponding prior probability, and updating the corresponding prior probability based on the model of the plurality of queries.

BRIEF DESCRIPTION OF THE DRAWINGS

The methods, systems, and/or programming described herein are further described in terms of exemplary embodiments. These exemplary embodiments are described in detail with reference to the drawings. These embodiments are non-limiting exemplary embodiments, in which like reference numerals represent similar structures throughout the several views of the drawings, and wherein.

DETAILED DESCRIPTION

In the following detailed description, numerous specific details are set forth by way of examples in order to provide a thorough understanding of the relevant teachings. However, it should be apparent to those skilled in the art that the present teachings maybe practiced without such details. In other instances, well known methods, procedures, systems, components, and/or circuitry have been described at a relatively high-level, without detail, in order to avoid unnecessarily obscuring aspects of the present teachings.

The present teaching relates to methods, systems, and programming for round trip optimization between application programming interface and database. Particularly, the present teaching is directed to methods and systems for round trip optimization between application programming interface and database through combining SQL queries into fewer SQL queries to reduce round trip optimization.

In an example, a method, implemented on a machine having at least one processor, storage, and a communication platform (e.g. cloud) connected to a network with a query optimizer is disclosed.

Figure 1:
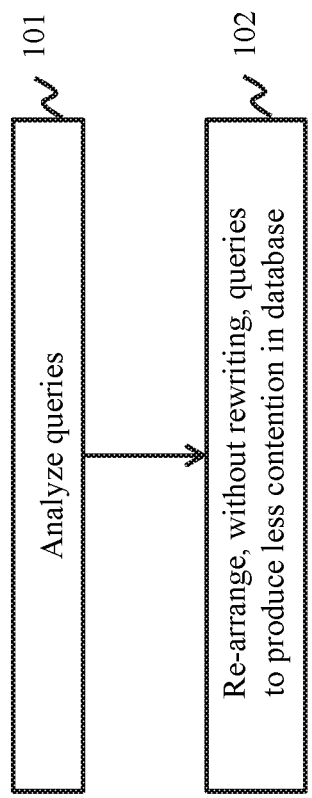
FIG. 1 illustrates query optimization method of prior art.
Figure 2A:
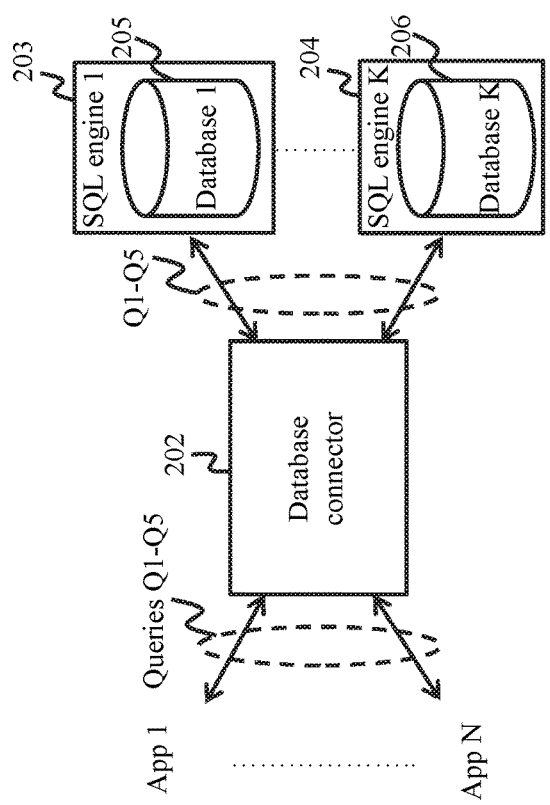
FIG. 2(a) illustrates a query optimization method of prior art.
Figure 2B:
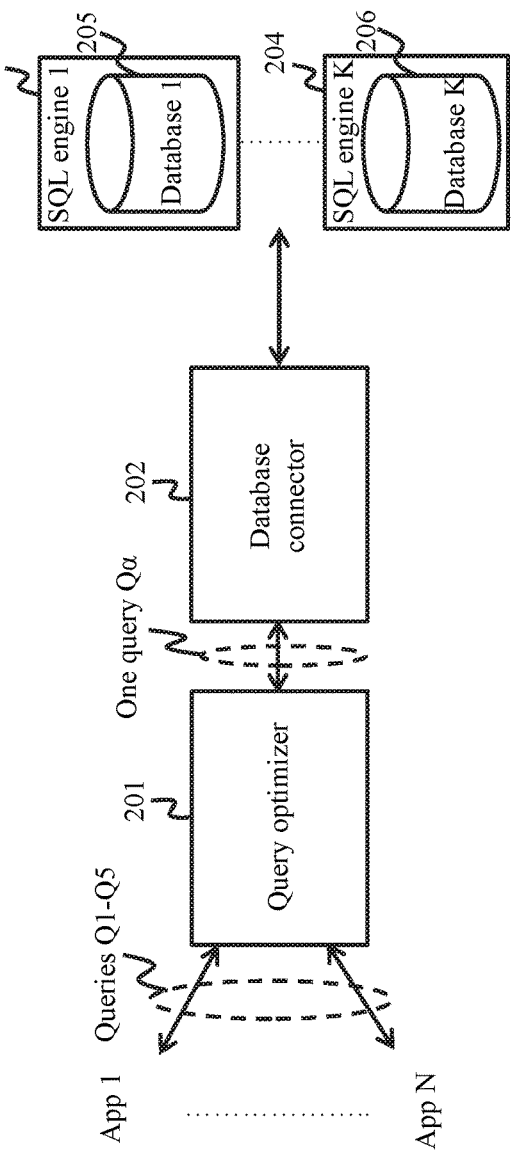
FIG. 2(b) illustrates an embodiment of query optimization of the present application.

FIG. 2(b) shows an exemplary general system of the present application including a query optimizer 201 maybe implemented between one or more applications App 1-N (N being natural number) and databases 1-K included in SQL engines 1-K (K being natural number). The query optimizer 201 may collect sequence of query statements Q1-Q5 such as query statements. Prior probabilities are computed based on database scheme; the prior probabilities are assigned to a large collection of potential relations. The query optimizer 201 may infer relation between the query queries (i.e. the query optimizer may infer models for different query statements). Based on the inferred relation, the query optimizer 201 may re-write queries on the fly, and the inferred relation may update the assigned prior probabilities. In this way, the query optimizer 201 may replace the queries with queries that require fewer round trips. In particular, the query optimizer may combine multiples queries into fewer queries by re-writing the queries without human interpretation and without the requirement of a proof of correction like QBS. In this way, five queries Q1-Q5 can be reduced to one query $Q_\alpha$, reducing communication with the database and increasing the efficiency and improving the latency.

Figure 3:
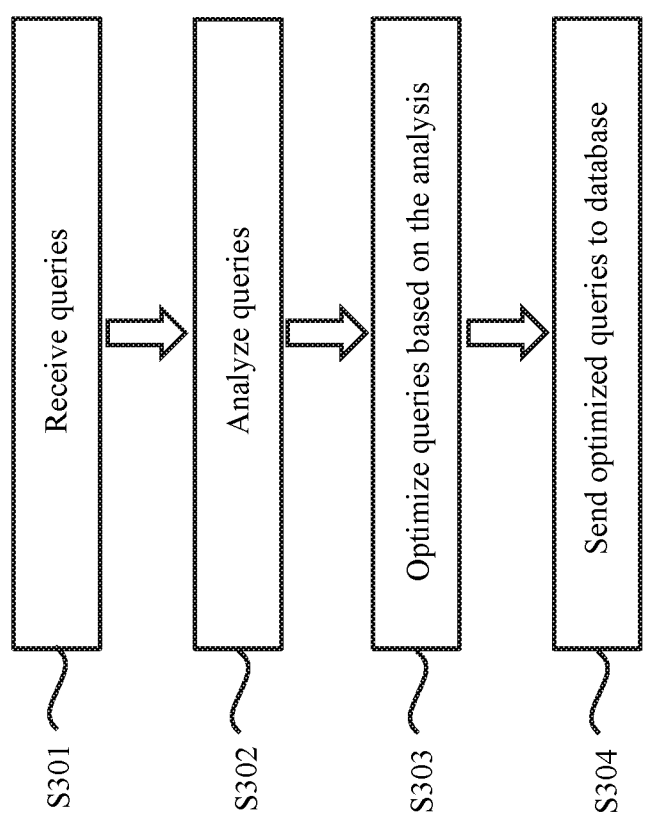
FIG. 3 illustrates an embodiment of a general method of query optimization of the present application.

FIG. 3 shows an exemplary method of the system in FIG. 2(b) including steps S301-S304. In step S301, queries are received. In step S302, queries are analyzed. In step S303, queries are optimized based on the analysis of the received queries. In step S304, optimized queries are sent to database.

Figure 4:
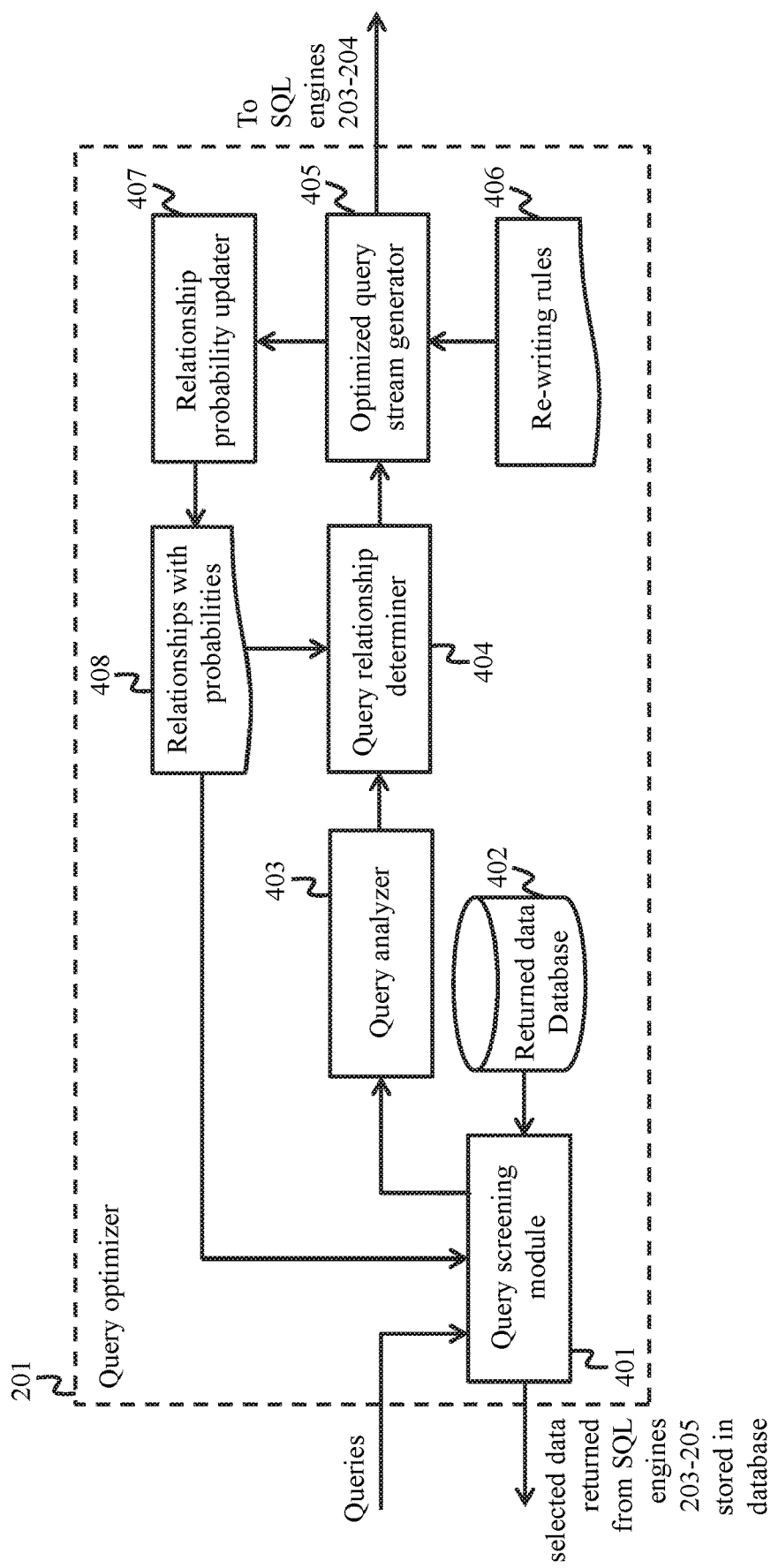
FIG. 4 illustrates an embodiment of query optimizer of the present application.

FIG. 4 shows a high-level depiction of an exemplary query optimizer 201. The query optimizer 201 may include query screening module 401, returned data database 402, query analyzer 403, query relationship determiner 404, optimized query stream generator 405, rewriting rules 406, relationship probability updater 407, and storage of relationships with probabilities 408. The query optimizer 201 maybe divided into two parts. The first part may compare the input queries passing through the query screening module 401 which may determine the input queries the same as the previously optimized queries from the optimized query stream generator 405, outputs the data returned by the databases and stored in the local database 402 storing the returned database data for the previously optimized queries immediately to the user without communicating with the databases. In particular, the query screening module 401 may compare the input queries with the optimized queries from relationship with probabilities 408. Once the input queries that are the same as the previously optimized queries are determined, the corresponding data stored in the local database 402 for the optimized queries maybe retrieved for the user immediately without communicating with the remote databases 205-206. In this way, the latency problem can be resolved by avoiding communication with the database. The query optimizer 201 may perform analysis on a session of query statements (such as SELECT statements) passing through the query optimizer 201.

For the queries not screened as the same as the previously optimized queries. The query optimizer 201 may collect sequences of query statements and associates them with features provided by the application, such as the URL of an HTTP request. If no feature is provided, the query optimizer 201 may use the queries themselves as features. The models collected by the query optimizer 201 may consist not only of sequences of (parametric) SELECT statements, but also the inferred relationships between those statements. For instance, the first query in a request may return a list of IDs which then appear in a subsequent request. The query optimizer 201 may infer these relationships by assigning prior probabilities to a large collection of potential relationships (the prior probabilities are computed from the database schema and simplicity), and updating the probabilities as the session of queries pass through.

Figure 5:
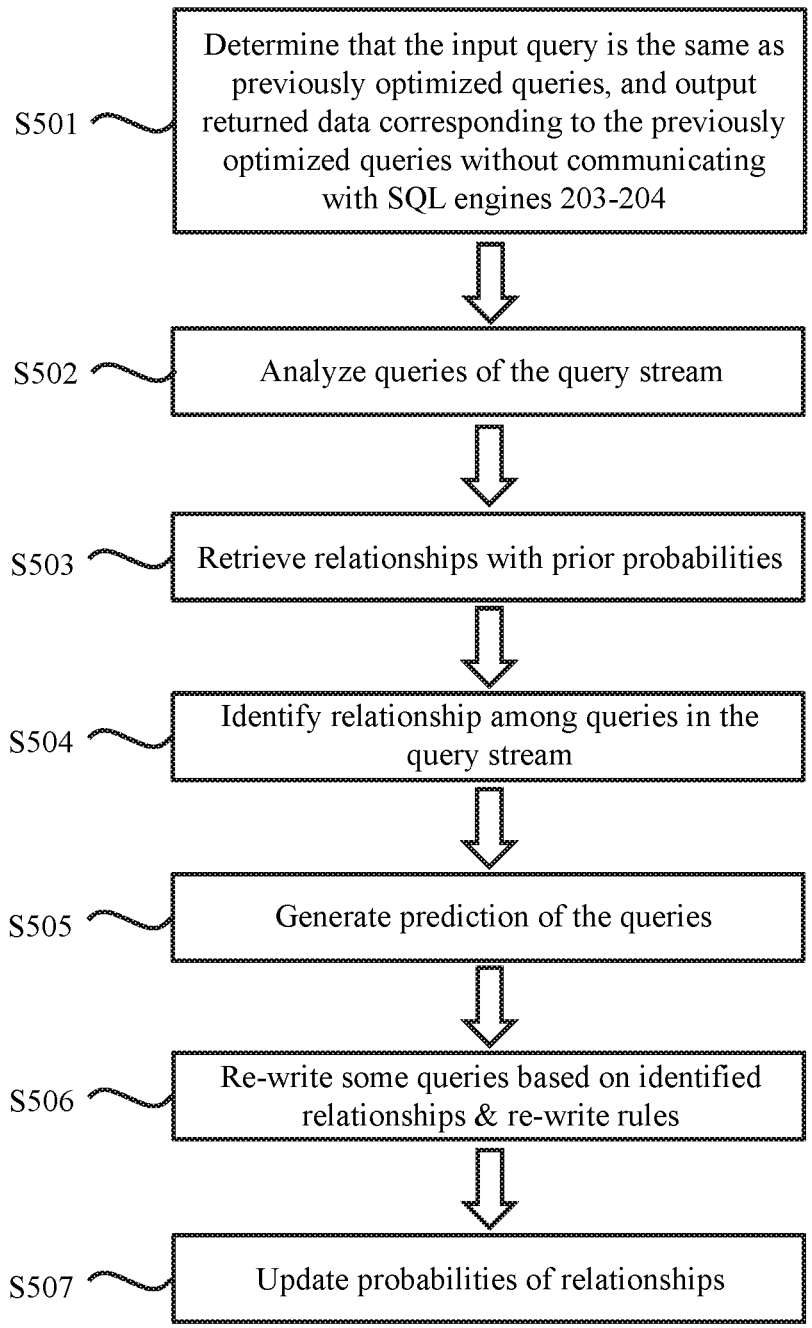
FIG. 5 illustrates an embodiment of a method of the query optimizer in FIG. 4 of the present application.

FIG. 5 shows an exemplary method of the system in the present application. Step S501 may compare the input queries passing through the query screening module 401 which may determine the input queries the same as the previously optimized queries from the optimized query stream generator 405, and output the data returned by the databases and stored in the local database 402 storing the returned database data for the previously optimized queries immediately to the user without communicating with the databases. If the queries are not determined as the same as the previously optimized queries in the same session or in any other session, the queries maybe analyzed in step S501. In step S502, the relationships with prior probabilities maybe retrieved, and in step S503, the relationships among queries in the query stream maybe identified. Then, predicted representations for the queries maybe generated in step S504. In step 505, the queries based on the identified relationships maybe re-written based on the re-write rules. Based on the re-written queries, the probabilities of relationships maybe updated in step S506.

Figure 6:
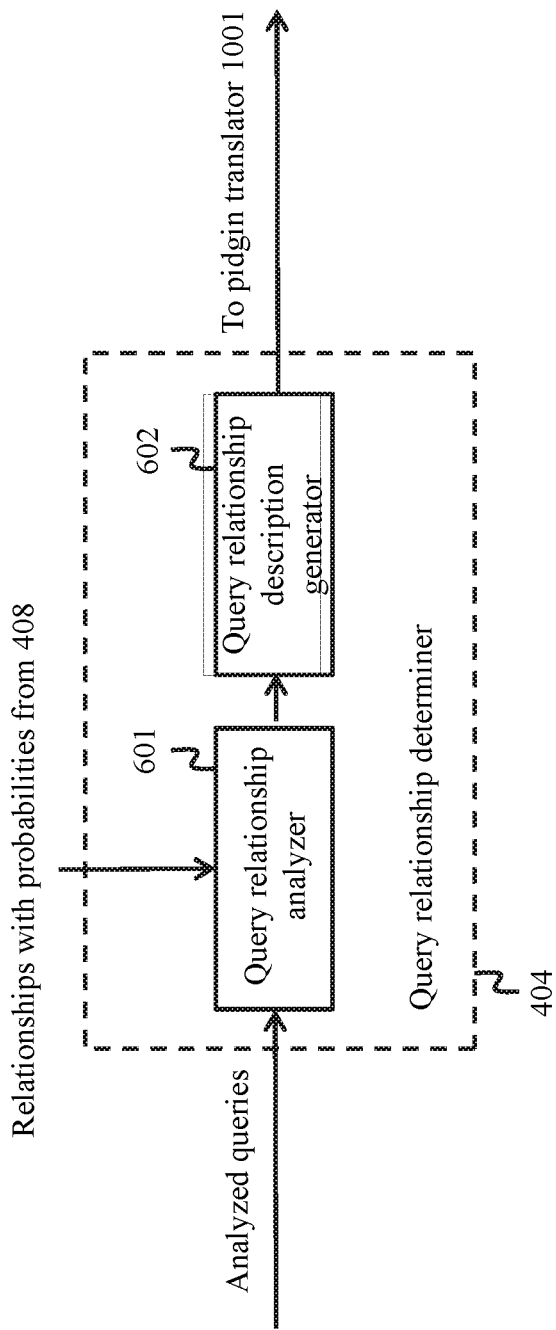
FIG. 6 illustrates an embodiment of the query relationship determiner of the present application.

FIG. 6 illustrates an embodiment of the query relationship determiner 404 of the present application. The query relationship determiner 404 may include a query relationship analyzer 601 and a query relationship generator 602. The analyzed queries may pass to the query relationship analyzer 601 and the query analyzer may analyze the queries based on the relationship with probabilities provided from storage 408. In this process, the queries maybe assigned with probabilities based on the relationship with probabilities provided from storage 408. Then, the queries with assigned probabilities maybe passed to the query relationship description generator 602 which may describe the relationship based on the assigned probabilities.

Figure 7:
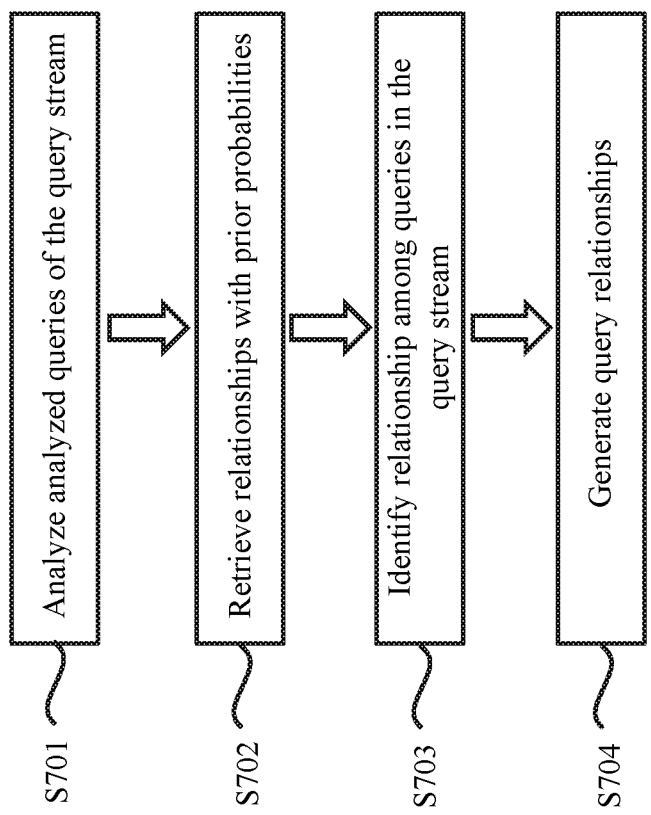
FIG. 7 illustrates an embodiment of a method of the query relationship determiner of FIG. 6 of the present application.

FIG. 7 shows the process of the system in FIG. 6. In particular, in step S701, the analyzed queries maybe analyzed based on the relationship with probabilities provided from storage 408. In step S702, the relationship with prior probabilities maybe retrieved for the analysis. In this process, the queries maybe assigned with probabilities based on the relationship with probabilities provided from storage 408. Then, the relationships between the queries maybe identified in step S703. In step 704, the relationships between the queries maybe generated.

Figure 8:
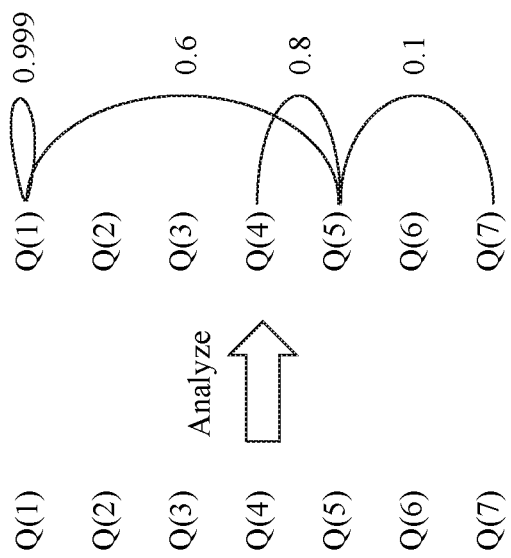
FIG. 8 illustrates an embodiment of a method of working in the query relationship determiner of FIG. 6 of the present application.

FIG. 8 shows the process of analysis of the queries in query relationship determiner 404, the queries Q(1) to Q(7) maybe analyzed based on based on the relationship with probabilities provided from storage 408 and probabilities maybe assigned to the queries, for example, the relationship between the queries Q(1) and Q(5) is assigned a probability of 0.6 but the relationship between the queries Q(5) and Q(7) is assigned 0.1 indicating that the linkage of Q(5) with Q(7) is highly unlikely. It is noted that for the query Q(1) while it is analyzed to be related to itself, the assigned probability is less than 1, indicating that the probabilistic nature of the analysis of the present application based on modelling.

Figure 9:
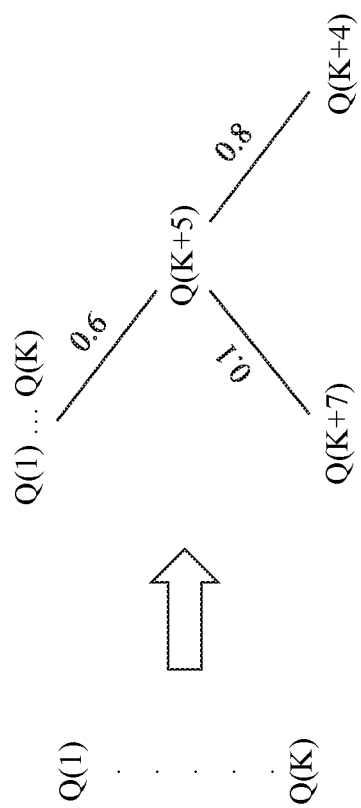
FIG. 9 illustrates an embodiment of another method of working in the query relationship determiner of FIG. 6 of the present application.

FIG. 9 illustrates an embodiment of a method of working in the query relationship determiner of FIG. 4 of the present application. The relationship between the queries maybe formed in the relation tree based on the probabilities, and the other queries in models that are related to the queries are linked to the queries.

Figure 10:
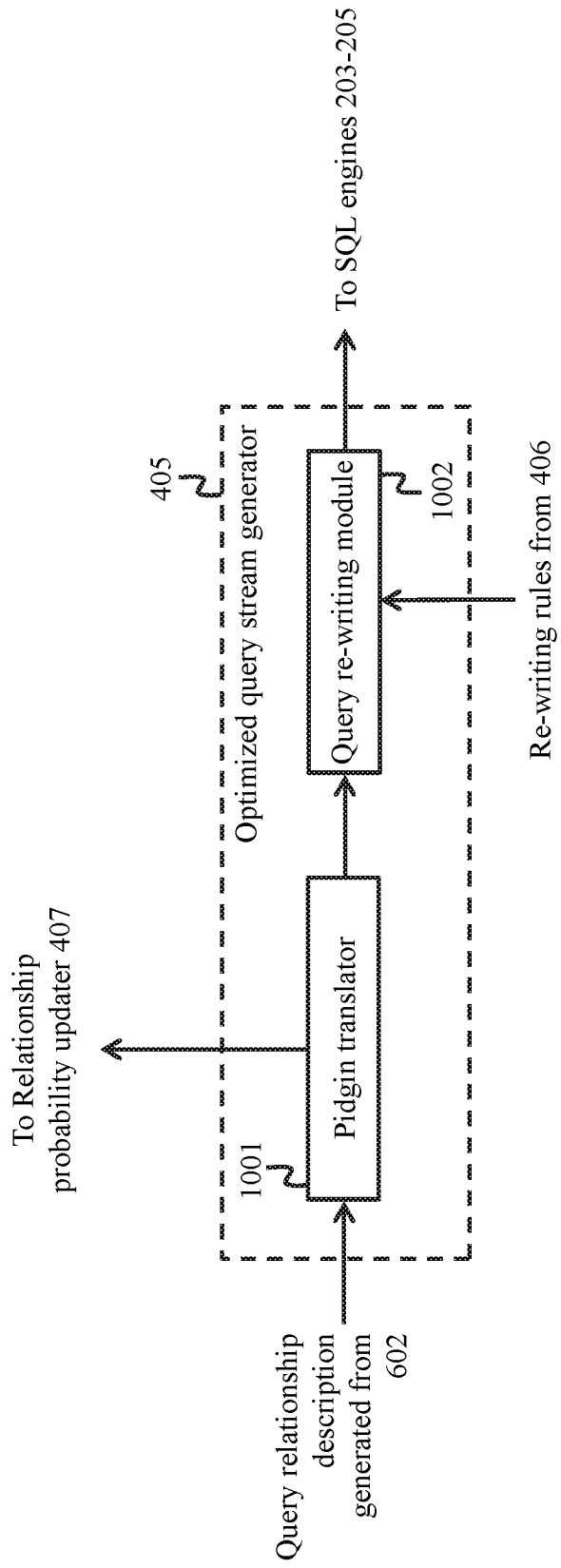
FIG. 10 illustrates an embodiment of the optimized query stream generator of FIG. 4 of the present application.

FIG. 10 illustrates an embodiment of the optimized query stream generator 405 of FIG. 4 of the present application. The optimized query stream generator 405 may include a pidgin translator 1001 and a query re-writing module 1002 based on re-writing rules from 406. The pidgin translator may output the translated description of query relationship to relationship probability updater 407. Then, the re-written queries in 1002 are outputted to the SQL engines of the databases.

Figure 11:
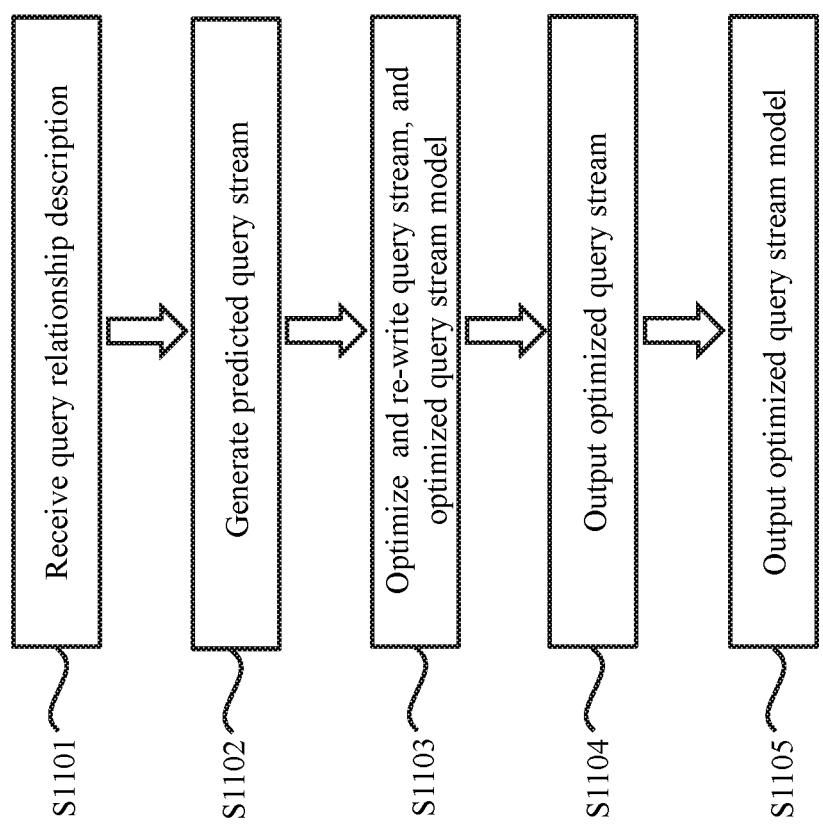
FIG. 11 illustrates an embodiment of a method of the optimized query stream generator of FIG. 4 of the present application.

FIG. 11 illustrates an embodiment of a method of the optimized query stream generator 405 of FIG. 4 of the present application, including steps S1101-S1105. In step S1101, the query relationship description maybe received from the query relationship description generator 602. Then, in step S1102, the query stream and the query stream model maybe generated. In step S1103, the predicted query stream and the query stream model maybe optimized. In steps S1104 and S1105, the optimized query stream and the query stream model maybe outputted.

Figure 12:
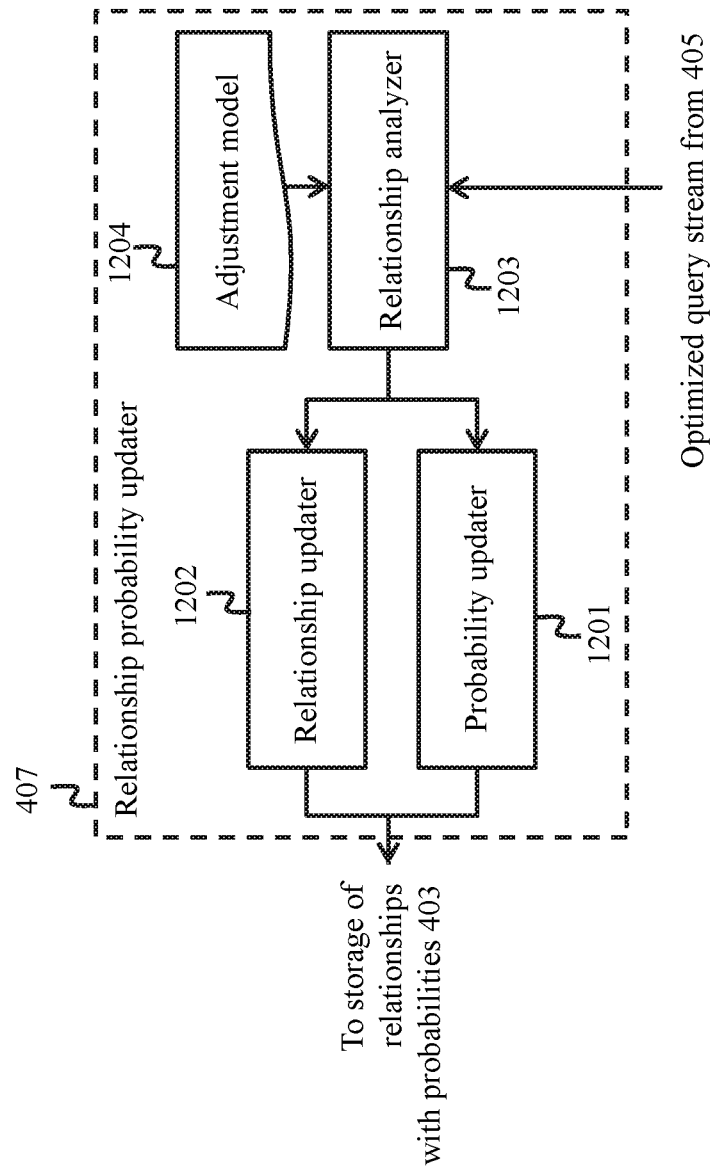
FIG. 12 illustrates an embodiment of the relationship probability updater of FIG. 4 of the present application.

FIG. 12 illustrates an embodiment of the relationship probability updater 407 of FIG. 4 of the present application. The relationship probability updater 407 may include probability updater 1201, relationship updater 1202, relationship analyzer 1203, and adjustment model 1204. The relationship analyzer 1203 may receive the optimized query stream from the optimized query stream generator 405. Based on the adjustment model 1204, the relationship analyzer 1203 may separate the relationship and probability from the optimized query stream to the relationship updater 1202 and the probability updater 1201 for update and to be stored in the storage of the relationships and probabilities 403.

Figure 13:
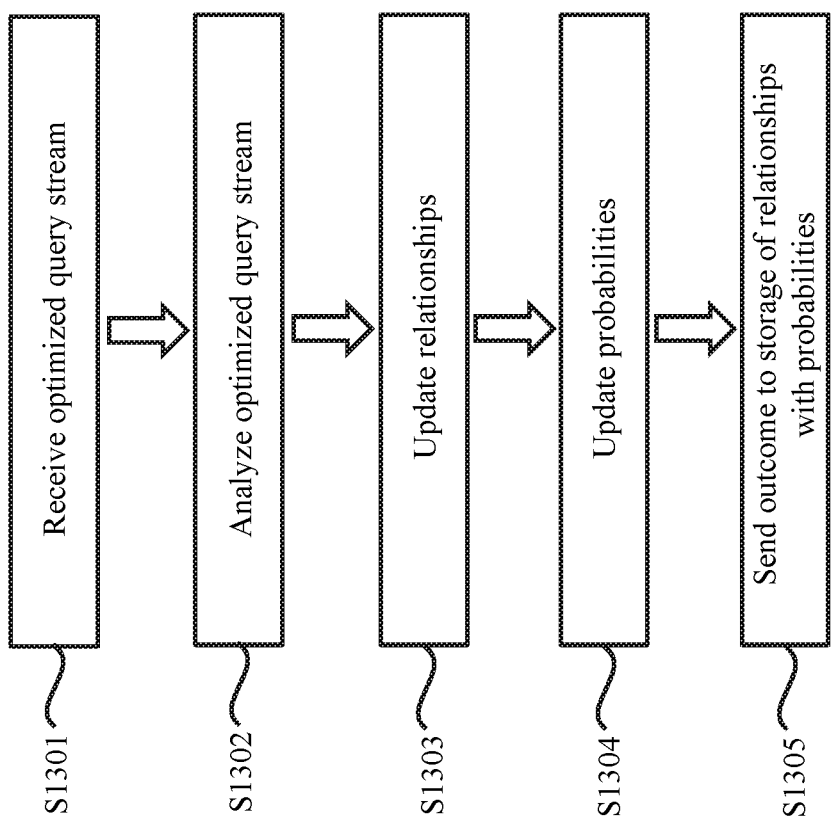
FIG. 13 illustrates an embodiment of a method of the relationship probability updater of FIG. 4 of the present application.

FIG. 13 illustrates an embodiment of a method of the relationship probability updater 407 of FIG. 4 of the present application. In step S1301, the optimized query stream maybe received from the optimized query stream generator 405. In step S1302, the optimized query stream maybe analyzed based on the adjustment model 1204. In step S1303, the relationships maybe updated. In step S1304, the probabilities maybe updated. In step S1305, the updated outcomes maybe sent to the storage of relationship with probabilities.

Figure 14:
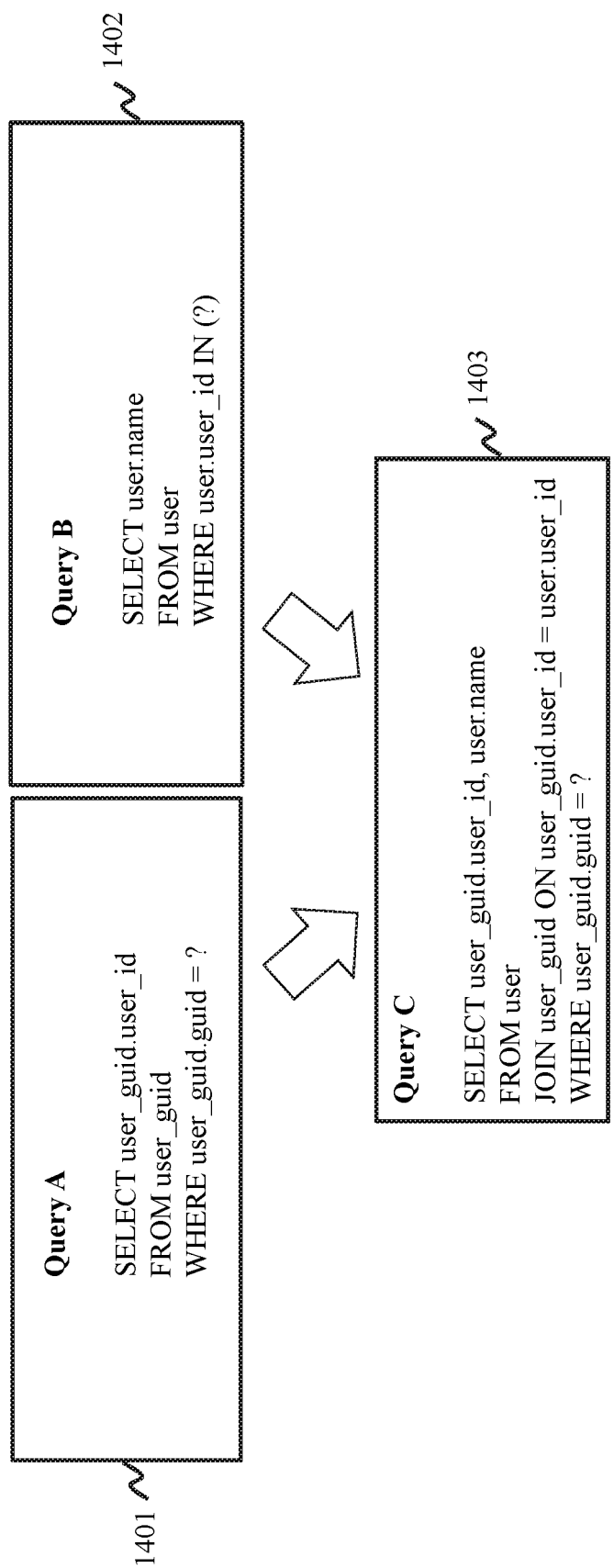
FIG. 14 illustrates an exemplary principle of a process of the optimized query stream generator of FIG. 4 of the present application.

FIG. 14 illustrates an exemplary principle of a process of the query optimizer 201 of FIG. 2(*b*) of the present application. In this example, the two queries in top row maybe processed through the query optimizer 201 of FIG. 2(*b*) of the present application and the final outcome maybe the single query in the bottom row, reducing the communication with the database. In particular, a query optimizer 201 called Java Database Connectivity (JDBC) Fusion is described. JDBC Fusion is a proposed Java library and is an exemplary shim of the present invention of this patent application that optimize the JDBC application programming interface (API). JDBC API is a Java API that connects and interacts with databases. JDBC API provides methods to query and update data in the database through updating SQL statements like CREATE, UPDATE, DELETE and INSERT and query statements such as SELECT, and JDBC API can run stored programs. The JDBC API uses Java standard classes and interfaces to connect to databases. JDBC driver that supports the JDBC API for that database server is required to use JDBC to connect Java applications (or 'Apps') to a specific database server, a JDBC driver that supports the JDBC API for that database server is required. To establish a connection between the Java App and the database, JDBC API requires the steps of: loading the JDBC driver; creating connection between the Java App and the database and the connection object uses a URL in specified format and JDBC driver communicates with the database object; executing SQL statements and JDBC Fusion condenses multiple inefficient SELECT statements into fewer, eager queries and, in this way, reduces the total latency of an App server's request latency. The JDBC Fusion can be dropped into any App server using any database technology that is backed by the JDBC APIs (e.g. Hibernate, jOOQ, spring-JDBC), while requiring zero modifications to an App's data access objects (DAOs). In FIG. 14, the same data can be obtained with a single query and with lower latency, i.e. Query 3 combines the two queries (Query 1 and Query 2) into one single query with one SELECT statement (and thus round trip) reduced to obtain the same results of both of the queries (Query 1 and Query 2). When a query gets data which can be parameter of another query, then the same data can be obtained by a single query with reduced communication with the database. Suppose app-server runs the above two top-row queries and suppose JDBC Fusion infers that the user_id returned by Query A becomes the parameter of Query B, and this is easy to infer with high confidence even if only a small number of requests have been sampled, as long as the requests return mostly distinct values for user_id. JDBC Fusion functions to infer that the same data can be obtained by running a single query (i.e. Query C). That is, through optimization, Query C is run to obtain the same result of the two top-row queries. Optimization in the query optimizer can be carried out with transformation rules are required to allow the JDBC Fusion to be effective at optimizing. In particular, a large bank of transformation rules are required to be applied to expression trees without changing their meaning. In particular, transformation rule 1 maybe transformations from relational algebra and these can be applied both to expressions that will synthesize into SQL and expressions that will be interpreted as server-side post-processing, including doubling/undoubling filters, commuting filters, swapping disjunctions with unions, distributing filters over joins, subtractions, unions, and intersections, doubling/undoubling projections, inserting/collapsing renames, and distributing projections over unions. Transformation rule 2 maybe transformations that move operators across the application/database (query) boundary. Transformation rule 3 maybe Query de-duplication. If the same query occurs twice in the expression tree, the second one is removed and replaced with a reference to the first one. Transformation rule 4 maybe "introduction" transformations. These transformations add additional tables and columns to a query, as well as projections and de-duplications which immediately remove the additional data. These "pointless" transformations work in tandem with the query de-duplication of transformation rule 3. Often, JDBC Fusion will enlarge two similar queries until they become identical. The projections and de-duplications which are accumulated during the process of enlargement will eventually become the application-side post-processing which the shim uses to maintain the application's illusion that it is running simple SQL queries.

Advantages of the Invention

Database-driven applications with large codebases will be the biggest benefactors of the query optimizer 201 in multiple ways. For example, the primary advantages are reduced latency of which the natural consequences are enhanced developer productivity, reduced server costs, and better user experience. Programmers are more productive because they can write simple queries instead of optimized (but usually sub-optimal) queries. Programmers using ORMs instead of writing queries will not need to spend time tweaking ORM settings for performance, and will never need to work around the ORM to produce more efficient queries.

An architecture of a computer which can be used to realize a specialized system implements the present teaching. Such a specialized system incorporating the present teaching has a functional block diagram illustration of a hardware platform which includes user interface elements. The computer maybe a general purpose computer or a special purpose computer. Both can be used to implement a specialized system for the present teaching. This computer maybe used to implement any component of the system as described herein, for example, the query optimizer 201.

The computer, for example, includes COM ports connected to and from a network connected thereto to facilitate data communications. The computer also includes a central processing unit (CPU), in the form of one or more processors, for executing program instructions. The exemplary computer platform includes an internal communication bus, program storage and data storage of different forms, e.g., disk, read only memory (ROM), or random access memory (RAM), for various data files to be processed and/or communicated by the computer, as well as possibly program instructions to be executed by the CPU. The computer also includes an I/O component, supporting input/output flows between the computer and other components therein such as user interface elements. The computer may also receive programming and data via network communications.

Hence, aspects of the methods of semi-distributed transaction commit processing, as outlined above, maybe embodied in programming. Program aspects of the technology maybe thought of as "products" or "articles of manufacture" typically in the form of executable code and/or associated data that is carried on or embodied in a type of machine readable medium. Tangible non-transitory "storage" type media include any or all of the memory or other storage for the computers, processors or the like, or associated modules thereof, such as various semiconductor memories, tape drives, disk drives and the like, which may provide storage at any time for the software programming.

All or portions of the software may at times be communicated through a network such as the Internet or various other telecommunication networks. Such communications, for example, may enable loading of the software from one computer or processor into another, for example, from one device into the hardware platform(s) of a computing environment or other system implementing a computing environment or similar functionalities in connection with semi-distributed transaction commit processing. Thus, another type of media that may bear the software elements includes optical, electrical and electromagnetic waves, such as used across physical interfaces between local devices, through wired and optical landline networks and over various airlinks. The physical elements that carry such waves, such as wired or wireless links, optical links or the like, also maybe considered as media bearing the software. As used herein, unless restricted to tangible "storage" media, terms such as computer or machine "readable medium" refer to any medium that participates in providing instructions to a processor for execution.

Hence, a machine-readable medium may take many forms, including but not limited to, a tangible storage medium, a carrier wave medium or physical transmission medium. Non-volatile storage media include, for example, optical or magnetic disks, such as any of the storage devices in any computer(s) or the like, which maybe used to implement the system or any of its components as shown in the drawings. Volatile storage media include dynamic memory, such as a main memory of such a computer platform. Tangible transmission media include coaxial cables; copper wire and fiber optics, including the wires that form a bus within a computer system. Carrier-wave transmission media may take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer may read programming code and/or data. Many of these forms of computer readable media maybe involved in carrying one or more sequences of one or more instructions to a physical processor for execution.

Those skilled in the art will recognize that the present teachings are amenable to a variety of modifications and/or enhancements. For example, although the implementation of various components described above maybe embodied in a hardware device, it may also be implemented as a software only solution—e.g., an installation on an existing server. In addition, the semi-distributed transaction commit processing as disclosed herein maybe implemented as a firmware, firmware/software combination, firmware/hardware combination, or a hardware/firmware/software combination.

While the foregoing has described what are considered to constitute the present teachings and/or other examples, it is understood that various modifications maybe made thereto and that the subject matter disclosed herein maybe implemented in various forms and examples, and that the teachings maybe applied in numerous applications, only some of which have been described herein. It is intended by the following claims to claim any and all applications, modifications and variations that fall within the true scope of the present teachings.

I claim:

1. A method implemented on a machine having at least one processor, storage, and communication platform connected to a network for optimizing query streams, comprising:
    receiving, by a query optimizer, a query stream comprising a first plurality of queries from one or more applications via the network; and
    in response to identifying in a storage that the first plurality of queries are different from a second plurality of queries of a previously optimized query stream,
        determining, by the query optimizer, relationships among the first plurality of queries, wherein each of the relationships is associated with a prior probability;
        generating, by the query optimizer, a predicted representation of the first plurality of queries based on the relationships with the corresponding prior probabilities;
        selecting, by the query optimizer, based on the predicted representation, at least two queries from the received query stream, wherein each of the at least two queries includes multiple query statements;
        re-writing, by the query optimizer, the at least two queries by combining the at least two queries into a single query to reduce a number of the first plurality of queries, wherein the single query includes at least part of content included in each of the least two queries and new content not in any of the at least two queries, and the single query has a fewer number of query statements than the total number of query statements included in the at least two queries;
        updating, by the query optimizer, prior probabilities based on queries in the optimized query stream; and
        communicating, by the query optimizer, with a remote database to send the optimized query stream to the remote database to reduce communication between the one or more applications and the remote database.

2. The method of claim 1, wherein the received queries are associated with features provided by the applications.

3. The method of claim 1, wherein the re-writing is processed by using a bank of transformation rules.

4. The method of claim 1, wherein the re-writing is processed by a library between the application programming interface and the database, and the library being Java database connectivity (JDBC) fusion.

5. The method of claim 1, further comprising:
    in response to identifying in the storage that if the first plurality of queries are same as the second plurality of queries,
        retrieving, without communicating with the remote database, from a local database of the query optimizer, data that is returned by the remote database according to the previously optimized query stream and is stored by the local database; and
        outputting the retrieved data.

6. A system, having at least one processor, storage, and a communication platform connected to a network for optimizing query streams, comprising:
    a query receiver implemented by a processor and configured for receiving a query stream comprising a first plurality of queries from one or more applications via the network;
    a query relationship determiner implemented by a processor and configured for in response to identifying in a storage that the first plurality of queries are different from a second plurality of queries of a previously optimized query stream, determining relationships among the first plurality of queries, wherein each of the relationships is associated with a prior probability;
    a query simulator implemented by a processor and configured for in response to identifying in the storage that the first plurality of queries are different from the second plurality of queries, generating a predicted representation of the first plurality of queries based on the relationships with the corresponding prior probabilities;
    a query writing module implemented by a processor and configured for in response to identifying in the storage that the first plurality of queries are different from the second plurality of queries,
        selecting, based on the predicted representation, at least two queries from the received query stream, wherein each of the at least two queries includes multiple query statements, and
        re-writing the at least two queries by combining the at least two queries into a single query to reduce a number of the first plurality of queries, wherein the single query includes at least part of content included in each of the least two queries and new content not in any of the at least two queries, and the single query has a fewer number of query statements than the total number of query statements included in the at least two queries;
    a query updater implemented by a processor and configured for in response to identifying in the storage that the first plurality of queries are different from the second plurality of queries, updating prior probabilities based on queries in the optimized query stream; and
    an optimized query stream generator implemented by a processor and configured for in response to identifying in the storage that the first plurality of queries are different from the second plurality of queries, communicating with a remote database to send the optimized query stream to the remote database to reduce communication between the one or more applications and the remote database.

7. The system of claim 6, wherein the received queries are associated with features provided by the applications.

8. The system of claim 6, wherein the re-writing is processed by using a bank of transformation rules.

9. The system of claim 6, wherein the re-writing is processed by a library of Java database connectivity (JDBC) fusion between the applications and the database.

10. The system of claim 6, wherein the query receiver is implemented by a processor and further configured for in response to identifying in the storage that the first plurality of queries are same as the second plurality of queries,
retrieving, without communicating with the remote database, from a local database of the query optimizer, data that is returned by the remote database according to the previously optimized query stream and is stored by the local database; and
outputting the retrieved data.

11. A machine-readable tangible and non-transitory medium having information for database operation, when read by the machine, causes the machine to perform the following:
receiving a query stream comprising a first plurality of queries from one or more applications via the network; and
in response to identifying in a storage that the first plurality of queries are different from a second plurality of queries of a previously optimized query stream,
determining relationships among the first plurality of queries, wherein each of the relationships is associated with a prior probability;
generating a predicted representation of the first plurality of queries based on the relationships with the corresponding prior probabilities;
selecting, based on the predicted representation, at least two queries from the received query stream, wherein each of the at least two queries includes multiple query statements;
re-writing the at least two queries by combining the at least two queries into a single query to reduce a number of the first plurality of queries, wherein the single query includes at least part of content included in each of the least two queries and new content not in any of the at least two queries, and the single query has a fewer number of query statements than the total number of query statements included in the at least two queries;
updating prior probabilities based on queries in the optimized query stream; and
communicating with a remote database to send the optimized query stream to the remote database to reduce communication between the one or more applications and the remote database.

12. The medium of claim 11, wherein the received queries are associated with features provided by the applications.

13. The medium of claim 11, wherein the re-writing is processed by using a bank of transformation rules.

14. The medium of claim 11, wherein the re-writing is processed by a library between the application programming interface and the database, and the library being Java database connectivity (JDBC) fusion.

15. The medium of claim 11, wherein the information, when read by the machine, causes the machine to further perform the following:
if the first plurality of queries are same as the second plurality of queries,
retrieving, without communicating with the remote database, from a local database of the machine, data that is returned by the remote database according to the previously optimized query stream and is stored by the local database; and
outputting the retrieved data.

16. The method of claim 1, wherein a number of queries included in the optimized query stream is less than a number of queries included in the selected subset of queries.

17. The method of claim 1, wherein the new content comprises a new statement that is not included in any of the at least two queries.

\* \* \* \* \*